March 9, 1926. 1,575,935
G. T. RANDLE
AIR MIXING AND FILTERING DEVICE
Original Filed Jan. 18, 1923

Inventor
George T. Randle,
By Louis M. Schmidt,
Atty.

Patented Mar. 9, 1926.

1,575,935

UNITED STATES PATENT OFFICE.

GEORGE T. RANDLE, OF SAYLESVILLE, RHODE ISLAND, ASSIGNOR TO THE MOTOR PROTECTION COMPANY, OF CENTRAL FALLS, RHODE ISLAND, A CORPORATION.

AIR MIXING AND FILTERING DEVICE.

Original application filed January 18, 1923, Serial No. 613,545. Patent No. 1,530,619. Divided and this application filed March 18, 1925. Serial No. 16,548.

*To all whom it may concern:*

Be it known that I, GEORGE T. RANDLE, a citizen of the United States, residing at Saylesville, in the county of Providence and State of Rhode Island, have invented certain new and useful Improvements in Air Mixing and Filtering Devices, of which the following is a specification.

My invention relates to improvements in air mixing and filtering devices of the form that is used in combination with protecting and cooling systems for electric motors and is adapted to be installed in the conduit line for delivering air to the motor, and as shown and described in the application that was filed by myself January 18, 1923, Serial No. 613,545, which was issued as Patent No. 1,530,619, March 24, 1925, and of which this is a division, and the object of my invention is to provide improved means as applied to the detailed structure of the device whereby the same is constructed and arranged in such form as to be simple and economical in manufacture and is convenient and efficient under conditions of operation.

In the accompanying drawing:—

Figure 1:
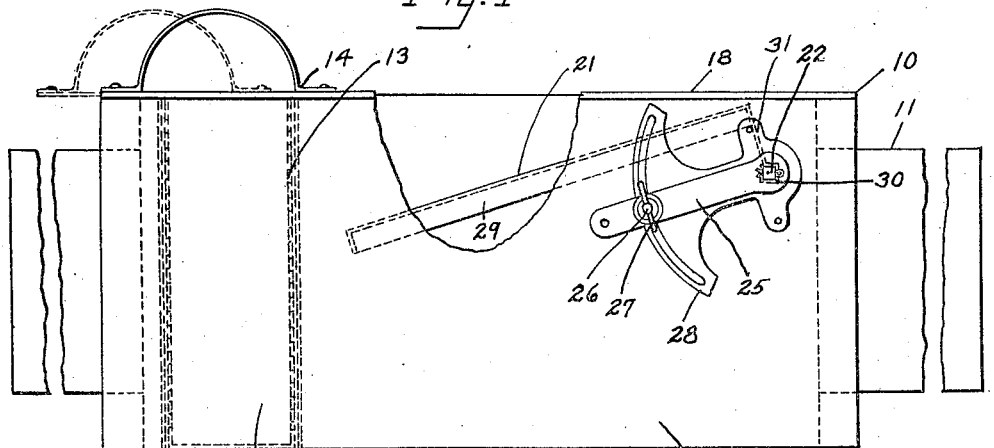
Figure 1 is a side elevation of my improved air mixing and filtering device, with a part broken away showing part of the damper, and other parts of the damper being shown by broken lines.
Figure 2:
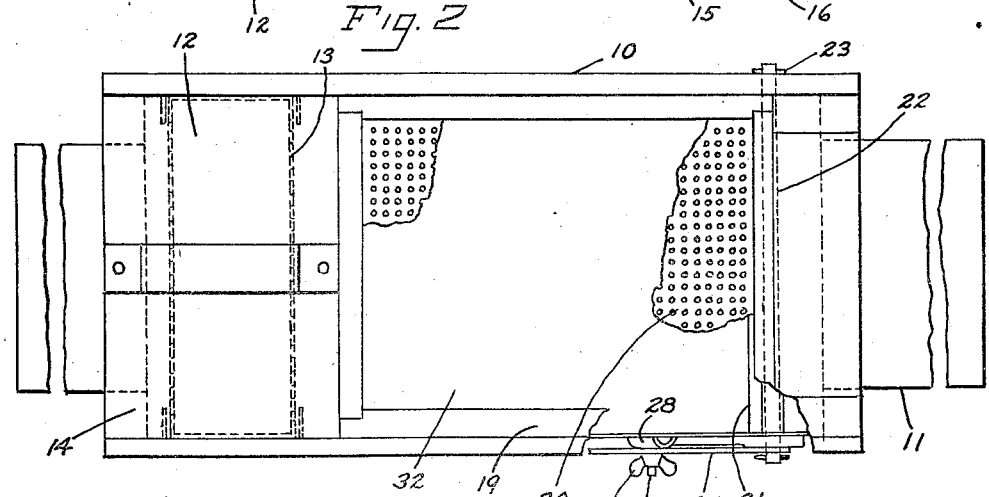
Figure 2 is a plan view of the same, the screen plate being in part broken away to show portions of the interior structure, particularly the locking mechanism for the damper.
Figure 3:
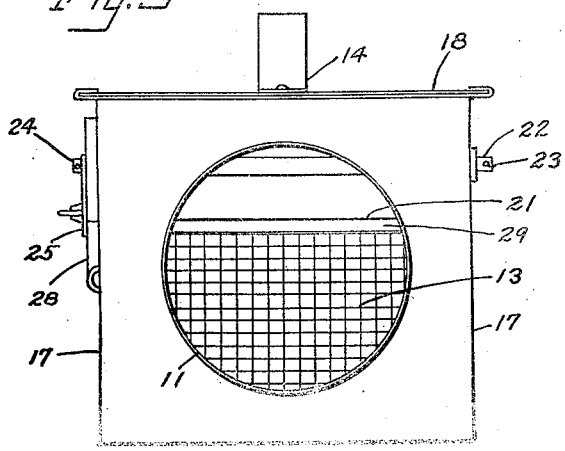
Figure 3 is an end elevation of the same, as viewed from the inlet or receiving end.

My improved air mixing and filtering device is made of sheet metal and comprises a box-like body portion 10 of rectangular or substantially square form of cross-section and appreciable length that is provided at the ends with terminals 11 of cylindrical form that are adapted to make connection with the conduit structure for delivering the air to the motor on one side and for receiving the outside air on the other side of the device.

As shown, the terminal 11 at the right is connected to the conduit that receives the outside air and the terminal 11 at the left is connected to the conduit that delivers the air to the motor, and which may consist of a mixture of the outside air and air from within the room.

The body portion 10 comprises at the left or delivery end a compartment 12 in the form of a dust collector in which the filtering of the air is effected and which compartment is defined by end walls 13 of wire mesh and which may be provided at the upper side with cover or door 14 that may be opened and closed by a sliding movement.

The walls 13 are spaced apart so as to admit therebetween the filtering structure which may be of ordinary form, such materials as horsehair being used or any material that will serve to prevent the passage of solid particles that are suspended in the air.

The major portion of the body 10, at the right or receiving side of the dust collector 12, is the structure of the air mixer 15.

Said air mixer 15, as shown, comprises a closed and flat bottom 16, parallel and flat side walls, 17, and a top or roof 18 that is for the most part open.

Said roof 18 comprises a rectangular skeleton border or frame 19 having the opening bridged by means of perforated sheet metal, as shown, or by means of relatively fine wire mesh 20, otherwise substantially like that that is used for the end walls of the dust collector compartment 12.

In use, warm air is admitted from the room through the screened opening 20 described.

In order to control the relative quantity of warm air from the room and cold air from outside a damper or gate 21 is provided in the air mixer 15.

As shown, said damper 21 is supported from a shaft 22 that is itself supported from the side walls 17, the ends of the shaft projecting through said walls and being provided with cotter-pins 23.

Actuating means for the damper 21 are provided mounted on the front end portion 24 of the shaft 22 in the form of the lever 25, positioned preferably in parallelism with the damper 21. Also, locking means are provided in the form of the locking stud 26 and nut 27 that are carried by the lever or crank-arm 25 and cooperate with a slotted quadrant or sector 28.

The damper 21 is a flat-plate-like structure and may be provided with reinforcing flanges 29 at the edges, and as to dimensions, it fits against the sides 17 and in the closed position covers the screened opening 20.

The shaft 22 is of square form of cross-section and the means for supporting the damper 21 therefrom comprise a sleeve 30 that fits over said shaft and a radially directed connecting piece 31 intermediate said sleeve 30 and the rear end portion of the damper 21, said piece 31 serving to compensate for the downward off-set position of the shaft 22 relatively to the top 18.

Thus, notwithstanding the fact that the shaft 22 extends across the interior of the mixing chamber 15 and is located appreciably below the top 18 the damper 21 in the closed position fits snugly against the walls of the opening 32 that is bridged by the screen or mesh 20.

It will be noted that the opening in the top 18 is appreciably greater in area than that in the inlet terminal 11. Also, there is excess of length over the width. Thus a relatively small angular movement serves to change the damper 21 from the position of closing one opening to closing the other.

The utility of the device described is found for the most part during cold weather, when it serves to provide means for preventing the condensation of moisture on the conduits leading to the motor.

I claim as my invention:

1. An air mixer for being connected into an air conduit system and having a box-like body structure, said body structure having a relatively extended side opening for air in one of the lateral walls, a plate-like damper housed within said body structure and fitting against the opposed inner border walls of said opening, a shaft extending across the interior of said body structure and operatively supported by other of said lateral walls, said shaft being spaced inwardly from said border walls, supporting means intermediate said shaft and damper, and said supporting means being constructed and arranged to compensate for the spacing of the shaft and damper, whereby notwithstanding such spacing the damper will fit flatwise against the border walls of the opening.

2. An air mixer comprising a box-like body structure having means at the ends for connecting into an air conduit, said body structure having an opening in the top wall, a damper housed within said body structure and fitting over said opening, a shaft extending through the side walls of said body structure and having bearings therein, said bearings being in spaced relation to said opening, a connecting piece intermediate said shaft and damper and said connecting piece serving to position said damper in off-set relation to said shaft to compensate for the spacing of said bearings relatively to said opening.

3. An air mixer as described in claim 2, said shaft having an extension on the outer end, a handle thereon, and means for locking said handle.

4. In an air mixer, a box-like structure for being connected in an air conduit and having an opening in the side wall, a damper for said opening, a shaft supporting said damper and having one end extended outwardly through one of the side walls of said structure, a crank on said end, and a locking device for said crank comprising a plate that is mounted on said side wall, said plate having an arcuate slot and said crank having a locking screw that operates in said slot and engages with the border walls thereof.

GEORGE T. RANDLE.